(12) United States Patent
Cho et al.

(10) Patent No.: US 11,705,960 B2
(45) Date of Patent: Jul. 18, 2023

(54) MILLIMETER-WAVE REPEATER FOR INTERMEDIATE FREQUENCY BAND TRANSMISSION

(71) Applicant: ADRF KOREA, Inc., Icheon-si (KR)

(72) Inventors: Chan Ki Cho, Icheon-si (KR); Baek yong Park, Yeoju-si (KR)

(73) Assignee: ADRF KOREA, Inc., Icheon-si (KR)

( * ) Notice: Subject to any disclaimer, the term of this patent is extended or adjusted under 35 U.S.C. 154(b) by 176 days.

(21) Appl. No.: 17/344,179

(22) Filed: Jun. 10, 2021

(65) Prior Publication Data

US 2022/0399935 A1 Dec. 15, 2022

(51) Int. Cl.
*H04B 7/155* (2006.01)
*H04B 7/0413* (2017.01)

(52) U.S. Cl.
CPC ....... *H04B 7/15542* (2013.01); *H04B 7/0413* (2013.01); *H04B 7/15535* (2013.01)

(58) Field of Classification Search
CPC .............. H04B 7/15542; H04B 7/0413; H04B 7/15535
See application file for complete search history.

(56) References Cited

U.S. PATENT DOCUMENTS

| | | | | |
|---|---|---|---|---|
| 8,649,418 | B1 * | 2/2014 | Negus | H04B 7/08 375/211 |
| 2012/0322366 | A1 * | 12/2012 | Davies | H04B 7/12 455/7 |
| 2019/0020401 | A1 * | 1/2019 | Gharavi | H04W 52/46 |
| 2020/0204249 | A1 * | 6/2020 | Pyun | H04J 14/0256 |
| 2020/0252100 | A1 * | 8/2020 | Jacobs | H04W 8/24 |
| 2020/0252107 | A1 * | 8/2020 | Jacobs | H04B 7/026 |
| 2020/0367257 | A1 * | 11/2020 | Hormis | H04B 7/15528 |
| 2020/0403689 | A1 * | 12/2020 | Rofougaran | H04W 52/245 |
| 2021/0242916 | A1 * | 8/2021 | Lomayev | H04B 7/15557 |
| 2021/0391915 | A1 * | 12/2021 | Choi | H04B 7/0413 |
| 2022/0399935 | A1 * | 12/2022 | Cho | H04B 7/15535 |

FOREIGN PATENT DOCUMENTS

| | | | | |
|---|---|---|---|---|
| KR | 1020090019611 | A | 2/2009 | |
| KR | 100896172 | B1 * | 5/2009 | ......... H04B 7/15542 |
| KR | 1020180121223 | A | 11/2018 | |
| KR | 102099602 | B1 | 4/2020 | |
| KR | 102235844 | B1 * | 4/2021 | ......... H04B 7/15528 |
| WO | WO-2021202469 | A1 * | 10/2021 | ......... H04B 7/15535 |

* cited by examiner

*Primary Examiner* — Brian D Nguyen
(74) *Attorney, Agent, or Firm* — Dinsmore & Shohl LLP; Yongsok Choi, Esq.

(57) ABSTRACT

A millimeter-wave repeater may be provided to cover a radio shaded area, in a system for the millimeter-wave repeater. The millimeter-wave repeater may provide a service by changing a signal of a millimeter-wave band to an intermediate frequency band, and then changing the signal to the millimeter-wave band again.

8 Claims, 7 Drawing Sheets

MILLIMETER-WAVE REPEATER FOR INTERMEDIATE FREQUENCY BAND TRANSMISSION

BACKGROUND

1. Field

The disclosure relates to a millimeter-wave repeater for intermediate frequency band transmission, and a system therefor. More particularly, the disclosure relates to a millimeter-wave repeater, which provides a technology for stably maintaining a service even when there are unnecessary signal inputs, a propagation environment problem, or various installation site variables.

2. Description of the Related Art

In a millimeter-wave relay service, a millimeter-wave repeater is installed to expand a service radius and cover a radio shaded area. In a general millimeter-wave repeater, when an unnecessary signal corresponding to a frequency other than a service channel is input, an unnecessary wave other than a desired signal is also amplified, and thus a system may be damaged or service quality may deteriorate. When the system is unable to perform a function due to such a reason, another shaded area is generated.

In this regard, the disclosure provides a repeater for reducing a signal of a millimeter-wave band to an intermediate frequency band to transmit the signal, and then converting the intermediate frequency band to the millimeter-wave band again to provide a service.

In a repeater that serves a signal of a millimeter-wave band equal to or greater than 20 GHz as a $5^{th}$ generation (5G) signal, when an unnecessary signal other than a set channel is excessively introduced to a corresponding amplification system from a millimeter frequency band relay system, it is difficult to manufacture a filter for suppressing only the unnecessary signal without affecting service quality, and the cost for manufacturing the filter is also very high. In addition, it is necessary to solve a cost issue of a cable being used for long-distance transmission of a millimeter-wave signal band.

SUMMARY

Provided is a millimeter-wave repeater capable of providing a stable millimeter-wave relay service without a change in service quality, by using a filter through which only a desired band is passed by converting a millimeter-wave frequency into an intermediate frequency, expanding a transmission distance via transmission in the intermediate frequency, and then converting the intermediate frequency into the millimeter-wave frequency.

Additional aspects will be set forth in part in the description which follows and, in part, will be apparent from the description, or may be learned by practice of the presented embodiments.

According to one or more embodiments, a millimeter-wave repeater includes a donor input/output unit configured to separate a downlink signal and an uplink signal of a radio signal, and including a transmission output processing unit for performing low-noise amplification on an input downlink signal and transmitting an amplified signal to a donor channel filter unit, and a reception output processing unit for outputting the uplink signal input from the donor channel filter unit in an assigned level the donor channel filter unit configured to convert the downlink signal of the donor input/output unit into an intermediate frequency signal by using a frequency mixer, perform channel filtering on the intermediate frequency signal, and transmit a channel-filtered signal to a donor multiplex transmission unit, and convert the uplink signal input to the donor multiplex transmission unit into a signal of a millimeter-wave band by using the frequency mixer and transmit the signal of the millimeter-wave band to the donor input/output unit, the donor channel filter unit including a reference signal unit for generating and transmitting a reference frequency signal, the donor multiplex transmission unit including a multiplexer for coupling and transmitting the downlink signal input to the donor channel filter unit and a plurality of signals, and configured to transmit the input uplink signal to the donor channel filter unit, a transmission unit configured to transmit a signal, a server multiplex transmission unit including a downlink multi-distribution unit configured to separate, from the downlink signal input to the transmission unit, a modem signal for communication and the reference frequency signal for synchronization with a phase synchronization circuit, and an uplink transmission unit configured to transmit the uplink signal input via a server channel filter unit to the transmission unit, the server channel filter unit configured to convert an intermediate frequency downlink signal input to the server multiplex transmission unit into a signal in a millimeter-wave band by using the frequency mixer and transmit the signal in the millimeter-wave band to a server input/output unit, perform frequency mixing on an uplink frequency of the server input/output unit and convert a mixed signal into an intermediate frequency, and perform channel filtering on a converted signal and transmit a filtered signal to the server multiplex transmission unit, the server input/output unit including a transmission output processing unit configured to output the downlink signal output from the server channel filter unit in an assigned level, and a reception output processing unit configured to perform low-noise amplification on the uplink signal and transmit an amplified signal to the server channel filter unit, and a power supply unit configured to perform a function of supplying power.

The donor input/output unit may be configured to support an antenna having a 2×2 multi-input multi-output (MIMO) structure. The server channel filter unit may include the phase synchronization circuit using the reference frequency signal of the reference signal unit of the donor channel filter unit. The millimeter-wave repeater may further include a control unit configured to monitor and control an operation state of the millimeter-wave repeater by monitoring an output level for each channel of the donor input/output unit and server input/output unit, and processing a level for each channel to be output in a uniform level.

The control unit may adjust a final gain by attenuating a gain of one of the donor multiplex transmission unit and server multiplex transmission unit, by using output level information of the downlink signal and output level information of the uplink signal. The power supply unit may be configured to transmit information related to normality of power supply to the control unit. The donor multiplex transmission unit and the server multiplex transmission unit may each include a band signal equalizer for compensating for frequency attenuation. The donor multiplex transmission unit and the server multiplex transmission unit may each include a variable gain adjustment device for uniformly maintaining attenuation according to a length of a transmission path.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
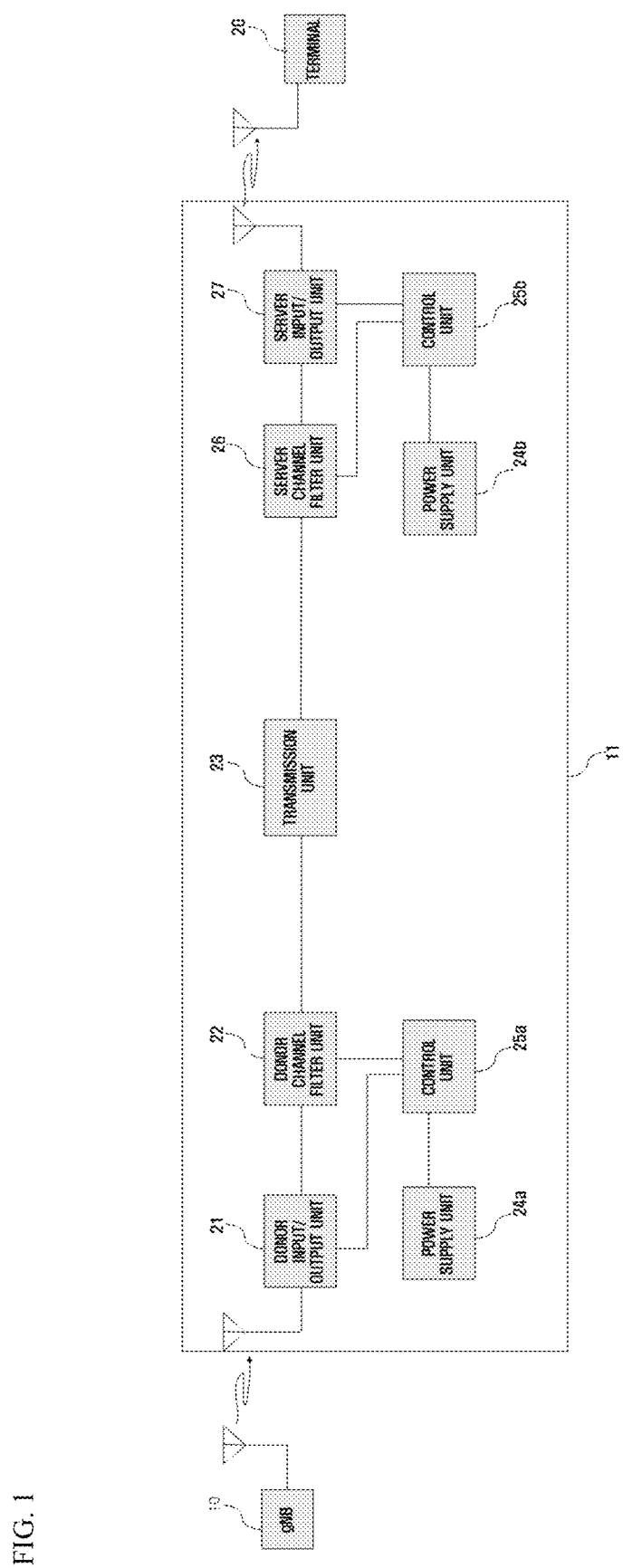
FIG. 1 is a diagram of a configuration of a general millimeter-wave repeater.

Hereinafter, embodiments of the disclosure will be described in detail with reference to the accompanying drawings such that one of ordinary skill in the art may easily implement the disclosure. However, the disclosure may be implemented in various different forms and is not limited to embodiments described herein. In the drawings, parts irrelevant to the description are omitted to clearly describe embodiments of the disclosure.

Also, the terms used in the present specification are only used to describe specific embodiments, and are not intended to limit the disclosure. An expression used in the singular may encompass the expression in the plural, unless it has a clearly different meaning in the context.

In the present specification, it is to be understood that terms such as "including", "having", "comprising", etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Further, components shown in embodiments of the disclosure are independently illustrated to represent different characteristic functions, and it does not mean that the components are formed in units of separate pieces of hardware or single piece of software. In other words, the components are described by listing the components for convenience of description, and at least two components may form one component or one component may be divided into a plurality of components to perform a function. An integrated embodiment and separated embodiments of each component are also included in the scope of the disclosure unless deviated from the essence of the disclosure.

Hereinafter, embodiments of the disclosure will be described with reference to accompanying drawings.

FIG. 1 is a diagram of a downlink signal configuration of a general millimeter-wave repeater 11, wherein a signal input from a gNodeB (gNB) 10 through an antenna is transmitted to a remote place via transmission unit 23 after a frequency is separated via a donor input/output unit 21, and an assigned frequency is transmitted and a gain is adjusted via a donor channel filter unit 22, and is emitted to a terminal 20 via a server input/output unit 27 by passing through a server channel filter unit 26 and adjusting the gain. An uplink signal input through the terminal 20 is transmitted to the transmission unit 23 after low-noise amplification via the server input/output unit 27 and filtering via the server channel filter unit 26, and an uplink signal input through the transmission unit 23 is emitted through an antenna after gain adjustment via the donor channel filter unit 22 and amplification via the donor input/output unit 21. The gNB 10 receives the emitted signal and provides a service. Power supply units 24 and 28 are respectively positioned at a donor and a server, and control units 25 and 29 are also respectively positioned at the donor and the server.

As shown in FIG. 1, a signal flow in the general millimeter-wave repeater 11 has a limitation of a transmission distance because the signal emitted from the gNB 10 is transmitted in a millimeter-wave band.

Figure 2:
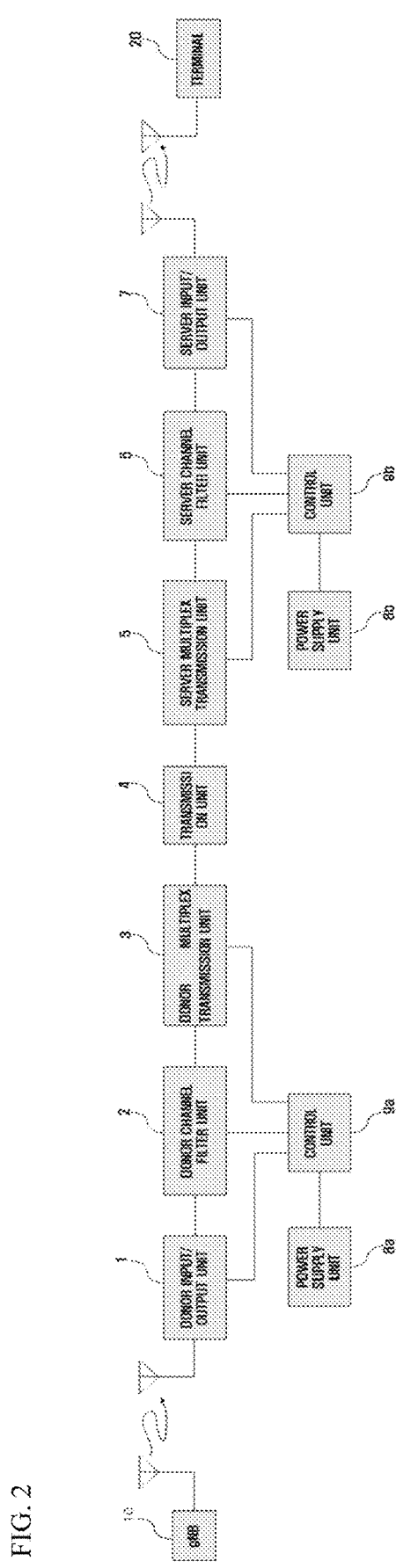
FIG. 2 is a diagram of a configuration of a millimeter-wave repeater, according to an embodiment of the disclosure.

FIG. 2 is a diagram of a configuration of a millimeter-wave repeater, according to an embodiment of the disclosure.

Figure 3A:
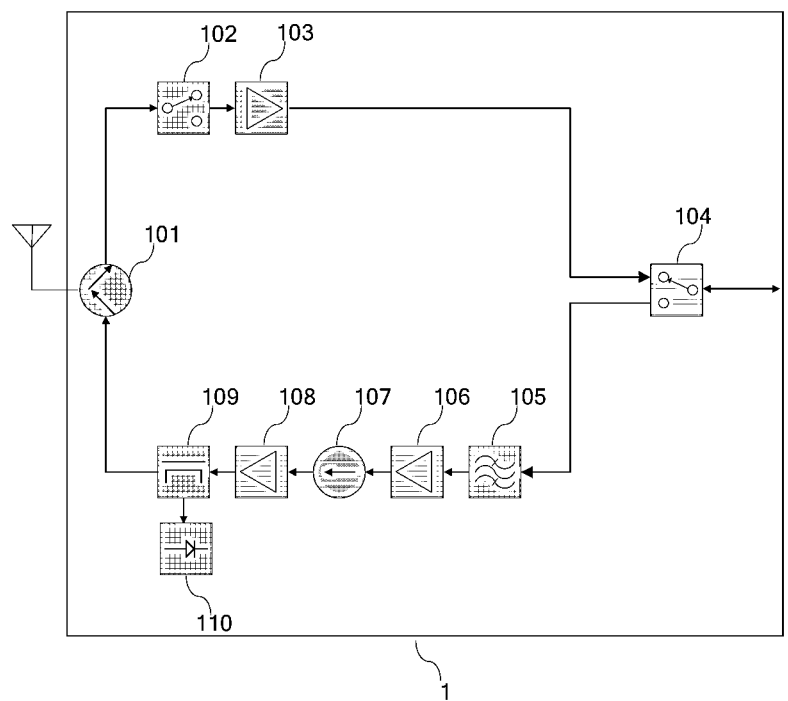
FIG. 3A is a diagram of a configuration of a donor input/output unit among a configuration of a millimeter-wave repeater, according to an embodiment of the disclosure.

To overcome the limitation of the transmission distance in the millimeter-wave band, when a downlink signal in a millimeter-wave band input from the gNB 10 is input to a donor input/output unit 1, according to an embodiment of the disclosure in FIG. 2, the downlink signal is input to a circulator 101 of FIG. 3A, an uplink signal is separated via a switch 102 for a low-noise amplifier 103 and is transmitted to a donor channel filter unit 2 via a signal separation switch 104. Regarding an uplink signal input to the donor channel filter unit 2, only the uplink signal is input to the signal separation switch 104, an image signal and an unnecessary wave of the uplink signal are removed via a band pass filter 105, the uplink signal is amplified via an amplifier 106, an isolator 107, and a high-output amplifier 108, input to the circulator 101 via a coupler 109 for signal detection, and is emitted to the gNB 10 through the antenna. Referring to FIG. 3A, the donor input/output unit 1 may be configured to support an antenna of a 2×2 multi-input multi-output (MIMO) structure.

Figure 3B:
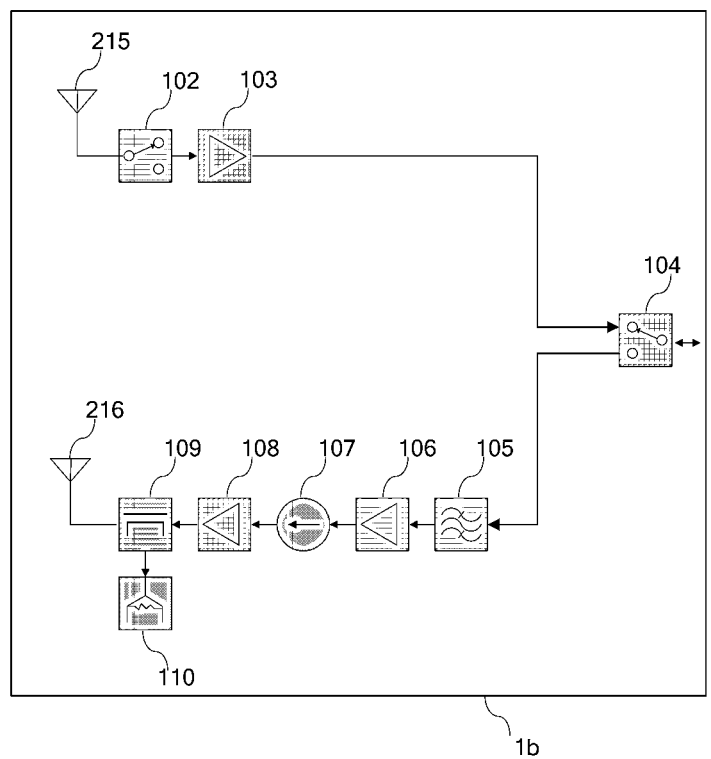
FIG. 3B is a diagram of a configuration of antenna separation of a donor input/output unit among a configuration of a millimeter-wave repeater, according to another embodiment of the disclosure.

Unlike FIG. 3A, FIG. 3B illustrates a configuration in which a downlink antenna and an uplink antenna are separately used. A downlink signal input to a donor antenna 215 is amplified via a low-noise amplifier 103 via a switch 102, and transmitted to the donor channel filter unit 2 via a signal separation switch 104. Regarding an uplink signal input to the donor channel filter unit 2, only the uplink signal is input to the signal separation switch 104, an image signal and an unnecessary wave of the uplink signal are removed via a band pass filter 105, the uplink signal is amplified via an amplifier 106, an isolator 107, and a high-output amplifier 108, input to a server antenna 216 via a coupler 109 for signal detection, and is emitted to the gNB 10 through the antenna.

Figure 4:
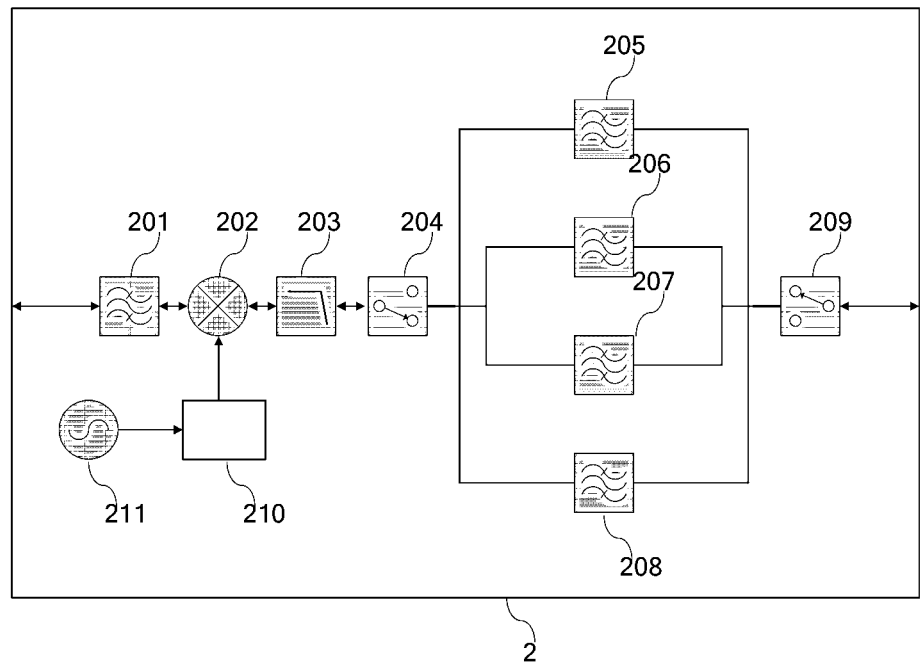
FIG. 4 is a diagram of a configuration of a donor channel filter unit among a configuration of a millimeter-wave repeater, according to an embodiment of the disclosure.

FIG. 4 is a diagram of a configuration of the donor channel filter unit 2 among the configuration of the millimeter-wave repeater, according to an embodiment of the disclosure.

Referring to FIG. 4, a downlink signal in a millimeter-wave band transmitted to the donor input/output unit 1 is converted into an intermediate frequency via a signal synthesizer 202 after an unnecessary wave is filtered via a band pass filter 201. The converted intermediate frequency passes through a low-band pass filter 203, passes through high-performance band pass filters 205 through 208 via an N:1 switch 204, and then is transmitted to a donor multiplex transmission unit 3 via a 1:N switch 209. An uplink signal in an intermediate frequency input to the donor multiplex transmission unit 3 passes through the high-performance band pass filters 205 through 208 via the 1:N switch 209 and is transmitted to the signal synthesizer 202 via the N:1 switch 204 and the low-band pass filter 203. The uplink signal is converted into a signal in a millimeter-wave band via the signal synthesizer 202, and is transmitted to the donor channel filter unit 2 via an image filter removing filter 201. The donor channel filter unit 2 may include a reference signal unit 211 for generating and transmitting a reference frequency signal, and the signal synthesizer 202 inputs the reference frequency signal generated by the reference signal unit 211 to a phase synchronization circuit 210 and generates the intermediate frequency by synthesizing the reference frequency signal with a sum (+) or subtraction (−) signal of an output signal of the phase synchronization circuit 210 and an input millimeter-wave signal.

Figure 5:
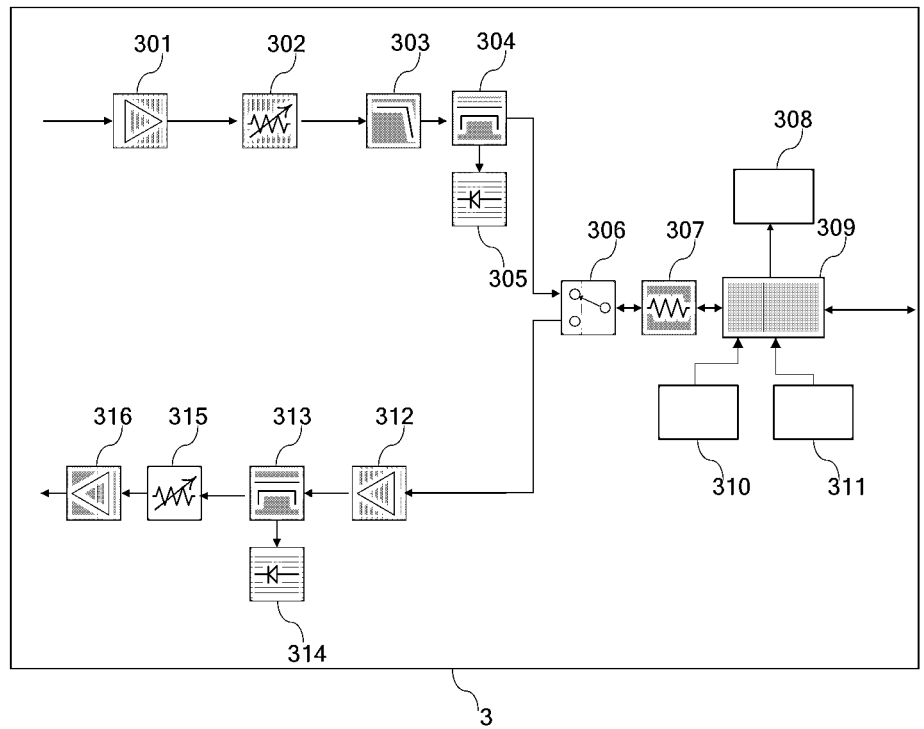
FIG. 5 is a diagram of a configuration of a donor multiplex transmission unit among a configuration of a millimeter-wave repeater, according to an embodiment of the disclosure.

FIG. 5 is a diagram of a configuration of the donor multiplex transmission unit 3 among the configuration of the millimeter-wave repeater, according to an embodiment of the disclosure.

Referring to FIG. 5, a downlink signal input to the donor multiplex transmission unit 3 after being converted into an intermediate frequency is amplified via an amplifier 301, passes through a variable gain adjustment device 302, passes through a low-frequency band pass filter 303, passes through a coupler 304 for detecting an output signal, passes through a downlink-uplink separation switch 306, is combined with a reference frequency signal 310 and a communication signal 311 for communication with a server at a multi-transmission coupler 309 via a band signal equalizer device 307, and is transmitted to a transmission unit 4. For $5^{th}$ generation (5G) time division duplex (TDD) signal analysis, a synchronization detection signal 308 may be used by being transmitted to a signal path. An uplink signal input through the transmission unit 4 is input to the multi-transmission coupler 309, passes through the band signal equalizer device 307, passes through the downlink-uplink separation switch 306 for signal separation, passes through an amplifier 312 for gain amplification, passes through a coupler 313 for input signal detection, passes through a variable gain adjustment device 315 for gain adjustment, passes through an amplifier 316 for gain amplification, and is transmitted to the donor channel filter unit 2.

Figure 6:
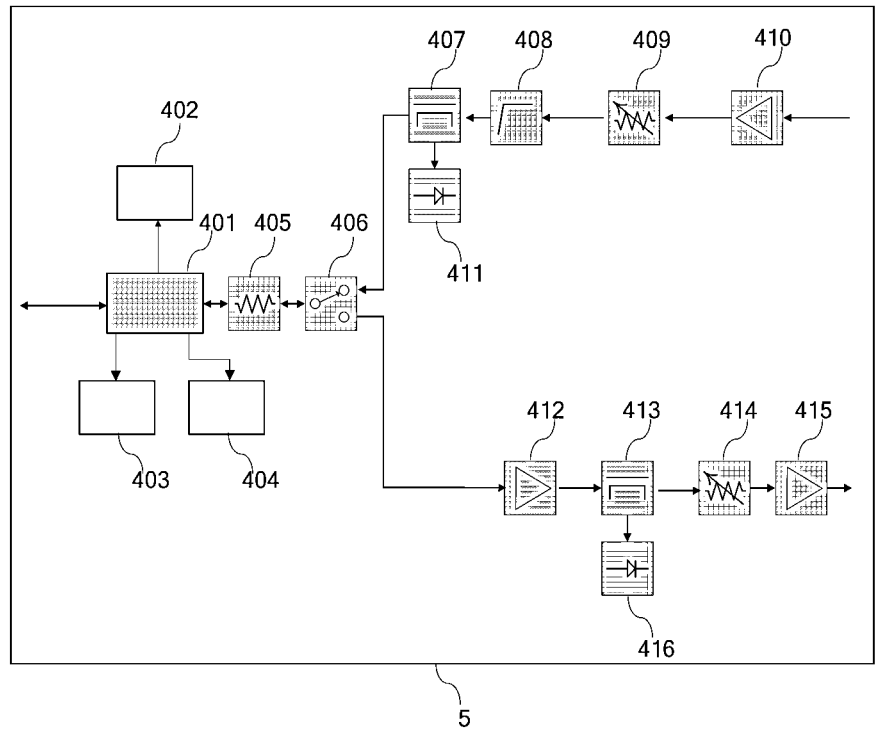
FIG. 6 is a diagram of a configuration of a server multiplex transmission unit among a configuration of a millimeter-wave repeater, according to an embodiment of the disclosure.

FIG. 6 is a diagram of a configuration of a server multiplex transmission unit 5 among the configuration of the millimeter-wave repeater, according to an embodiment of the disclosure.

Referring to FIG. 6, a downlink signal of the donor multiplex transmission unit 3 input via the transmission unit 4 is divided into a reference frequency signal 403, a communication signal 404 for communication with a server, a synchronization signal 402, and a downlink/uplink signal via a multi-signal distributor 401 of the server multiplex transmission unit 5, and the downlink signal passes through an amplifier 412 after signal separation via a gain adjustment device 405 and a signal separation switch 406, passes through a coupler 413 for input signal detection, passes through a variable gain device 414 and an amplifier 415 for gain amplification, and is transmitted to a server channel filter unit 6. Regarding an uplink signal, a signal input to the server channel filter unit 6 is amplified via an amplifier 410, passes through a variable gain adjustment device 409 for suitable gain adjustment, passes through a low-band pass filter 408, a coupler 407 for output signal detection, the signal separation switch 406, and the gain adjustment device 405 to be input to the multi-signal distributor 401, and is transmitted to the transmission unit 4.

Figure 7:
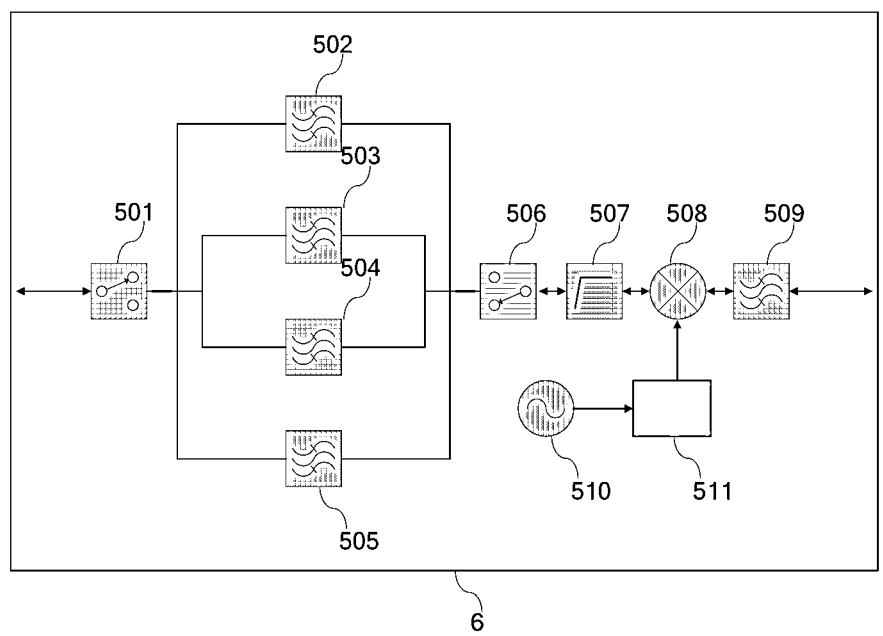
FIG. 7 is a diagram of a configuration of a server channel filter unit among a configuration of a millimeter-wave repeater, according to an embodiment of the disclosure.

FIG. 7 is a diagram of a configuration of the server channel filter unit 6 among the configuration of the millimeter-wave repeater, according to an embodiment of the disclosure.

A downlink signal input to the server multiplex transmission unit 5 of FIG. 7 passes through high-performance band pass filters 502 through 505 via a 1:N switch 501, is transmitted to a signal separation switch 506 via an N:1 switch 506, is converted into a millimeter-wave signal via a signal synthesizer 508 via a low-band pass filter 507, and is transmitted to a server input/output unit 7 via a band pass filter 509. An uplink signal input to the server input/output unit 7 passes through the band pass filter 509 for unnecessary wave filtering, and is converted into an intermediate frequency via the signal synthesizer 508. The intermediate frequency passes through the low-band pass filter 507, passes through the high-performance band pass filters 502 through 505 via the N:1 switch 506, and then is transmitted to the server multiplex transmission unit 5 via the 1:N switch 501. The server channel filter unit 6 may include a server reference signal unit 510 and a server phase synchronization circuit 511 using a same frequency as the reference frequency signal generated by the reference signal unit 211 of the donor channel filter unit 2.

Figure 8:
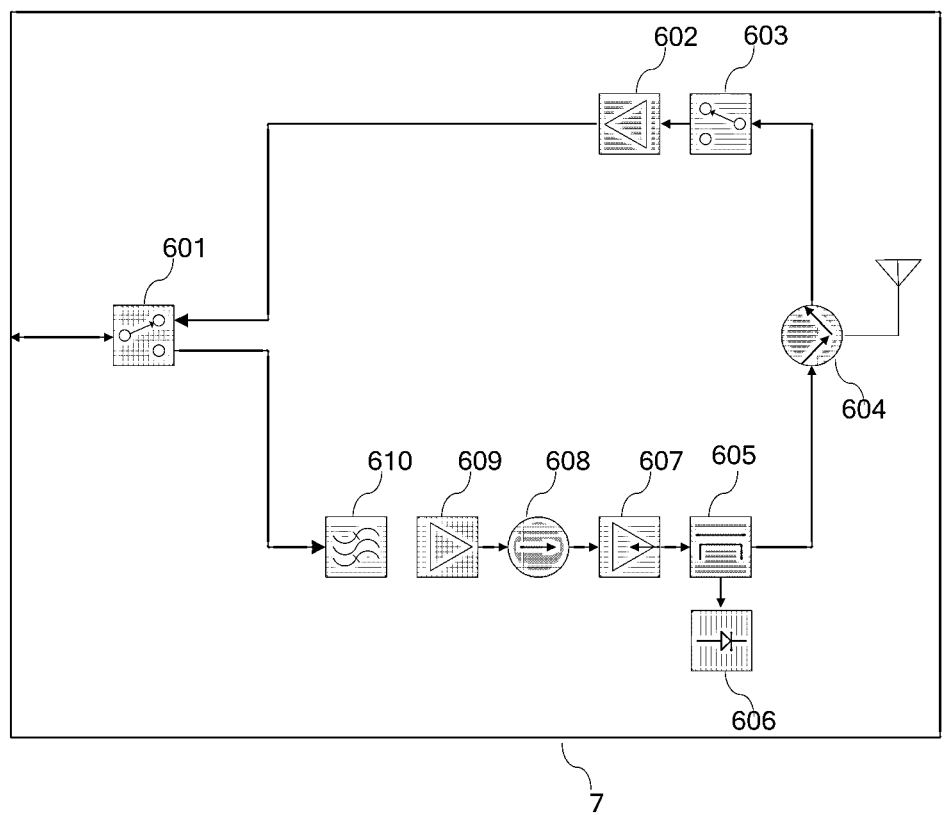
FIG. 8 is a diagram of a configuration of a server input/output unit among a configuration of a millimeter-wave repeater, according to an embodiment of the disclosure.

FIG. 8 is a diagram of a configuration of the server input/output unit 7 among the configuration of the millimeter-wave repeater, according to an embodiment of the disclosure.

Regarding a downlink signal input to the server channel filter unit 6, only the downlink signal is input to the signal separation switch 104, an image signal and an unnecessary wave of the downlink signal are removed via a band pass filter 610, the downlink signal is amplified via an amplifier 609, an isolator 608, and a high-output amplifier 607, input to a circulator 604 via a coupler 605 for signal detection, and is emitted to the terminal 20 through the antenna. Regarding an input signal input to the terminal 20, only the uplink signal is input to a downlink-uplink separation switch 603 and is transmitted to the server channel filter unit 6 via a low-noise amplifier 602 and a signal separation switch 601.

Regarding monitoring and controlling of a downlink signal, when an input of an input signal is higher than a rated level by A, output level information of an intermediate frequency downlink output detector 305 or 606 is monitored by control unit 9a or 9b, determined to be higher by A, and output after the variable gain adjustment device 302 or the variable gain device 414 attenuates and adjusts a gain by A. Regarding monitoring and controlling of an uplink signal, when an input of an input signal is higher than a rated level by A, output level information of an intermediate frequency downlink output detector 411 or 110 is monitored by the control unit 9a or 9b, determined to be higher by A, and output after the variable gain adjustment device 409 or 315 attenuates and adjusts a gain by A.

In detail, referring to the signal flow, when a signal input in a service signal level −60 dBm is amplified by a gain 50 dB via the donor input/output unit 1 under the same condition as above, the signal exceeds a standard of an output limit level −20 dBm of the donor multiplex transmission unit 3 (−10 dBm is output as an input level −60 dBm is amplified to total 50 dB in the donor input/output unit 1, the donor channel filter unit 2, and the donor multiplex transmission unit 3), and thus the control unit 9a controls a gain of the donor multiplex transmission unit 3 such that a final gain is adjusted to 40 dB, thereby outputting −20 dBm. Then, a −30 dBm signal lowered by −10 dB via the transmission unit 4 gains total 50 dB via the server multiplex transmission unit 5, the server channel filter unit 6, and the server input/output unit 7, and thus is output in a system output signal level 20 dBm. An uplink input/output configuration is similar to the downlink input/output configuration, and thus details thereof are not provided again.

Figure 9:
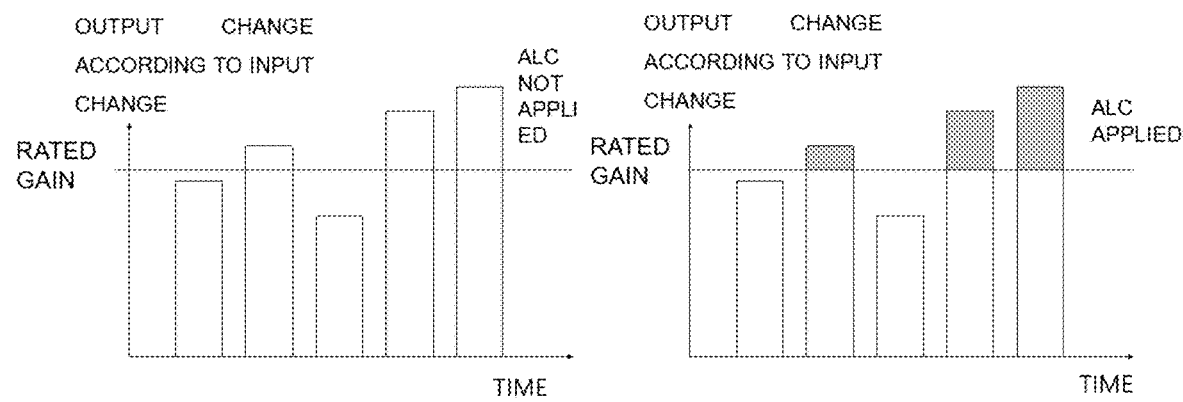
FIG. 9 is a diagram of an automatic gain control (AGC) operation of a general millimeter-wave repeater.

FIG. 9 is a diagram of an automatic gain control (AGC) operation of a general millimeter-wave repeater.

Figure 10:
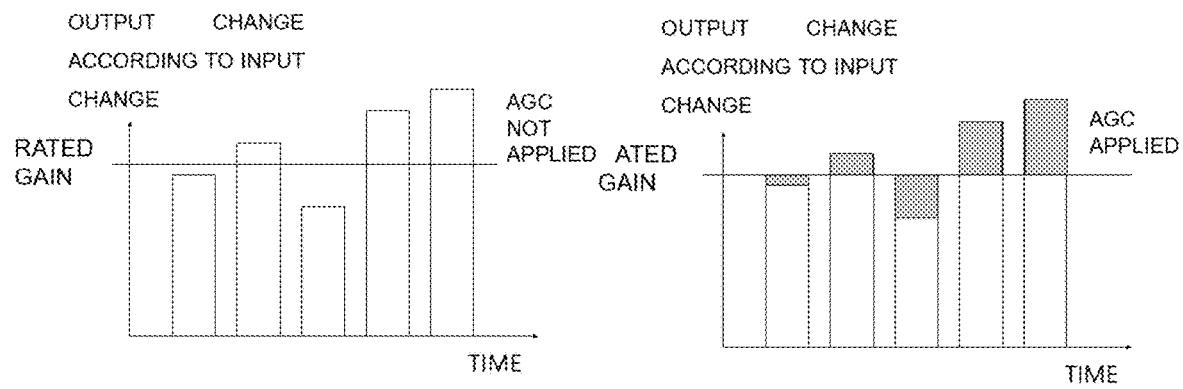
FIG. 10 is a diagram of an automatic level control (ALC) operation of a millimeter-wave repeater, according to an embodiment of the disclosure.

Referring to FIG. 9, in a case of envelope detection method or another detection method in the downlink output detector 305 using an output level adjustment method via general automatic gain adjustment, a 5G signal or a TDD service signal repeats on/off or is shaken in cycles within several us in a time domain, and time is consumed for a gain automatic adjustment function of an amplification unit to detect an output level of the 5G signal or TDD service signal and then adjust a gain thereof. Accordingly, when gain adjustment is performed based on inaccurate output level information while it is difficult to immediately and accurately detect an output, the output is unable to be maintained uniform and greater output level distortion may be aggravated. As shown in FIG. 10, a difference is generated between an actual output signal gain and a desired rated output gain in a service signal situation in which a signal input is repeated fluctuatively at short time cycles in the time domain, and when automatic gain adjustment is performed to compensate for the difference, a difference between a level detection time point and a gain adjustment performance time point is generated, and thus a distorted output level far from a desired output level is output to a system. In a section where there is no signal, level information of the downlink output detector 606 indicates a low value and the control unit 9a or 9b increases a gain by a difference between the desired output level and a level indicated by the downlink output detector 606. At this time, when an input is suddenly provided and an abnormal fluctuating signal is input to the switch 102, over-output occurs. In terms of a time axis, an unstable output is emitted and thus service quality is deteriorated, and in particular, components are damaged in an over-output situation.

FIG. 10 is a diagram of an automatic level control (ALC) operation of the millimeter-wave repeater, according to an embodiment of the disclosure.

Referring to FIG. 10, an automatic level output method of the millimeter-wave repeater, according to an embodiment of the disclosure, is shown. When a signal input from the gNB 10 via the antenna is output at the server input/output unit 7 via the donor input/output unit 1 and reaches an output level set via the control units 9a and 9b of the downlink output detector 305 of the donor multiplex transmission unit 3 and the downlink output detector 606, a signal higher than a rated output level is adjusted by the variable gain adjustment devices 302 and the variable gain device 414 such that an over-output is prevented from being emitted via the circulator 604. Also, even when a fluctuating signal is input, a stable service may be provided by decreasing an overall gain change and output change of a system in a time domain only when the fluctuating signal is equal to or greater than a certain level, instead of adjusting a gain all the time as in FIG. 9.

The control units 25 and 29 includes temperature detection units, may adjust gains of downlink and uplink signals by using information of the intermediate frequency downlink output detector 110, a level detection unit 314, a level detection unit 416, and the downlink output detector 606, control the server phase synchronization circuit 511 of the signal synthesizer 508 to synthesize an assigned frequency by using a signal of the reference signal unit 211 as a signal of the server phase synchronization circuit 511 via a transmission path, control channel settings of the donor channel filter unit 2 and the server channel filter unit 6 to set frequencies and channel widths for each channel, perform controls for normalization processing via information transmitted from the intermediate frequency downlink output detector 110, the level detection unit 314, the level detection unit 416, and the downlink output detector 606, and identify and monitor determined frequency information and temperature detection of an amplifier.

Also, the power supply units 24 may supply power to each component inside the millimeter-wave repeater and provide information about normality of power supply, to the control units 25 and 29.

According to the disclosure, a signal in a millimeter-wave band can be remotely relayed without deterioration of signal quality.

According to the disclosure, a millimeter-wave repeater for intermediate frequency band transmission can be provided by using a donor multiplex transmission unit and a server multiplex transmission unit.

The effects of the disclosure are not limited to those mentioned above, and other effects that are not mentioned may be clearly understood by one of ordinary skill in the art from the detailed description.

While the disclosure has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. A millimeter-wave repeater comprising:
   a donor input/output unit configured to:
   separate a downlink signal and an uplink signal of a millimeter-wave radio signal,
   perform low-noise amplification on an input downlink signal,
   transmit the amplified downlink signal to a donor channel filter unit, and
   output the uplink signal input from the donor channel filter unit in an assigned level;

the donor channel filter unit configured to:
  filter the amplified downlink signal via a band pass filter,
  convert the filtered amplified downlink signal into an intermediate frequency signal by using a frequency mixer,
  filter the intermediate frequency signal via a low-band pass filter,
  perform channel filtering on the filtered intermediate frequency signal through a plurality of band pass filters,
  transmit the channel-filtered intermediate frequency signal to a donor multiplex transmission unit, and
  convert the uplink signal from the donor multiplex transmission unit into a signal of a millimeter-wave band by using the frequency mixer and transmit the signal of the millimeter-wave band to the donor input/output unit, the donor channel filter unit including a reference signal unit for generating and transmitting a reference frequency signal;
the donor multiplex transmission unit including a multiplexer for coupling the channel-filtered intermediate frequency signal and the reference frequency signal and a communication signal, and configured to transmit the uplink signal to the donor channel filter unit;
a transmission unit configured to transmit a signal;
a server multiplex transmission unit including a downlink multi-distribution unit configured to separate, from the downlink signal input to the transmission unit, a modem signal for communication and the reference frequency signal for synchronization with a phase synchronization circuit, and an uplink transmission unit configured to transmit the uplink signal via a server channel filter unit to the transmission unit;
the server channel filter unit configured to convert an intermediate frequency downlink signal input to the server multiplex transmission unit into a signal in a millimeter-wave band by using the frequency mixer and transmit the signal in the millimeter-wave band to a server input/output unit, perform frequency mixing on an uplink frequency of the server input/output unit and convert a mixed signal into an intermediate frequency, and perform channel filtering on a converted signal and transmit a filtered signal to the server multiplex transmission unit; and
the server input/output unit configured to:
  output the downlink signal output from the server channel filter unit in an assigned level, and
  perform low-noise amplification on the uplink signal, and transmit the amplified signal to the server channel filter unit.

2. The millimeter-wave repeater of claim 1, wherein the donor input/output unit is configured to support an antenna having a 2×2 multi-input multi-output (MIMO) structure.

3. The millimeter-wave repeater of claim 1, wherein the server channel filter unit comprises the phase synchronization circuit using the reference frequency signal of the reference signal unit of the donor channel filter unit.

4. The millimeter-wave repeater of claim 1, further comprising a control unit configured to monitor and control an operation state of the millimeter-wave repeater by monitoring an output level for each channel of the donor input/output unit and the server input/output unit, and processing a level for each channel to be output in a uniform level.

5. The millimeter-wave repeater of claim 4, wherein the control unit adjusts a final gain by attenuating a gain of one of the donor multiplex transmission unit and the server multiplex transmission unit, by using output level information of the downlink signal and output level information of the uplink signal.

6. The millimeter-wave repeater of claim 1, wherein the donor multiplex transmission unit and the server multiplex transmission unit each comprise a band signal equalizer for compensating for frequency attenuation.

7. The millimeter-wave repeater of claim 6, wherein the donor multiplex transmission unit and the server multiplex transmission unit each comprise a variable gain adjustment device for uniformly maintaining attenuation according to a length of a transmission path.

8. The millimeter-wave repeater of claim 1, wherein the donor channel filter unit includes:
  a first switch configured to connect the filtered intermediate frequency signal with one of the plurality of band pass filters; and
  a second switch configured to connect the one of the plurality of band pass filters with the donor multiplex transmission unit.

\* \* \* \* \*